United States Patent
Kumpf et al.

(10) Patent No.: US 11,028,871 B2
(45) Date of Patent: Jun. 8, 2021

(54) PLASTIC NUT, FASTENING SYSTEM AND FASTENING METHOD

(71) Applicant: NEWFREY LLC, New Britain, CT (US)

(72) Inventors: Markus Kumpf, Giessen (DE); Frank Rosemann, Giessen (DE)

(73) Assignee: NEWFREY LLC, New Britain, CT (US)

(*) Notice: Subject to any disclaimer, the term of this patent is extended or adjusted under 35 U.S.C. 154(b) by 0 days.

(21) Appl. No.: 16/368,079

(22) Filed: Mar. 28, 2019

(65) Prior Publication Data

US 2019/0301517 A1 Oct. 3, 2019

(30) Foreign Application Priority Data

Mar. 28, 2018 (EP) .................................... 18164454

(51) Int. Cl.

| | |
|---|---|
| F16B 37/00 | (2006.01) |
| F16B 5/02 | (2006.01) |
| F16B 33/00 | (2006.01) |
| F16B 39/28 | (2006.01) |
| F16B 39/282 | (2006.01) |
| F16B 39/284 | (2006.01) |

(52) U.S. Cl.
CPC ............. *F16B 37/005* (2013.01); *F16B 5/02* (2013.01); *F16B 5/0241* (2013.01); *F16B 33/006* (2013.01); *F16B 39/282* (2013.01); *F16B 39/284* (2013.01)

(58) Field of Classification Search
CPC ........ F16B 37/005; F16B 5/02; F16B 5/0241; F16B 33/006; F16B 39/282; F16B 39/284
See application file for complete search history.

(56) References Cited

U.S. PATENT DOCUMENTS

| | | | | |
|---|---|---|---|---|
| 2,129,009 | A | * 9/1938 | Kriwat | ................... F16B 39/284 411/203 |
| 9,303,678 | B2 | * 4/2016 | Ducornait | ........... F16B 37/0842 |
| 2004/0228701 | A1 | * 11/2004 | Blatz | ......................... B27B 5/32 411/190 |
| 2008/0166204 | A1 | * 7/2008 | Nilsen | ............... B29C 45/14418 411/378 |

(Continued)

FOREIGN PATENT DOCUMENTS

| | | | | |
|---|---|---|---|---|
| EP | 2851570 | A | 3/2015 | |
| EP | 2851570 | A1 | * 3/2015 | ............ F16B 33/006 |

(Continued)

OTHER PUBLICATIONS

FR 1226048; Brill; "Improvements to Fasteners"; Jun. 22, 2020; EPO Machine Translation; pp. 1-3.*
International Search Report dated Sep. 14, 2018.

*Primary Examiner* — Bayan Salone
(74) *Attorney, Agent, or Firm* — Michael P. Leary

(57) ABSTRACT

A plastic nut for multiple detachable fastening onto a stud with a thread protruding from a workpiece includes a base body with an inner surface partially defining a cylindrical recess penetrating the base body. A support surface is attached to the base body at an axial end of the plastic nut. A clamping device is attached to the plastic nut and configured to provide a clamping force between the plastic nut and the stud when the stud is installed in the cylindrical recess.

12 Claims, 3 Drawing Sheets

(56) References Cited

U.S. PATENT DOCUMENTS

2012/0141225 A1* 6/2012 Komsitsky .............. F16B 39/12
                                                   411/190
2013/0117996 A1* 5/2013 Ducornait ........... F16B 37/0842
                                                   29/525.02

FOREIGN PATENT DOCUMENTS

| FR | 1226048 A | * | 7/1960 | ............ F16B 37/005 |
| FR | 1226048 A |   | 7/1960 |                          |
| WO | 0073672 A |   | 12/2000 |                         |

* cited by examiner

PLASTIC NUT, FASTENING SYSTEM AND FASTENING METHOD

CROSS-REFERENCE TO RELATED APPLICATION

This application claims priority from European Patent Application No. 18164454.3, filed on Mar. 28, 2018, the disclosure of which is incorporated herein by reference.

BACKGROUND OF THE INVENTION

The present invention is directed to a plastic nut for multiple detachable fastening an object with respect to a stud protruding from a workpiece, comprising a base body having a cylindrical recess penetrating the base body and a support surface, wherein the base body, inside of the cylindrical recess, comprises an inner surface for receiving a thread of the threaded stud.

Furthermore, the present invention relates to a fastening system comprising a stud which has a flange section and a stem section which extends from the flange section and has a stud thread, wherein a side of the flange section that faces away from the stem section is designed as a joining side for joining the stud onto a workpiece, and comprising a plastic nut of the type referred to above.

Finally, the present invention relates to a method for fastening an object which has an opening, with respect to a stud which is joined to a workpiece of a fastening system.

In the field of fastening technology, in particular in the field of fastening technology in motor-vehicle body manufacturing, it is known to fasten objects to workpieces via a fastening system of the type referred to above. In this connection, a stud is joined onto the workpiece, such as a sheet metal section of a vehicle body, in particular by what is referred to as stud welding, or by adhesively bonding the stud to the workpiece. However, the stud may also be joined on the workpiece in any other manner.

The fastening system furthermore comprises a plastic nut.

In order to fasten an object such as, for example a trim panel or the like, to the workpiece, the object is placed with the opening thereof onto the stud, which protrudes in relation to the workpiece in such a manner that the stud protrudes opposite the opening. The plastic nut can then be screwed onto the stud until the support surface of said plastic nut enters into contact with the object.

In the case of this fastening system which is known since long, it may be necessary to detach the plastic nut from the stud to fasten another object or to replace the fastened object if for example the fastened object is damaged. The inner surface of the plastic nut may deform due to the fastening and detaching such that, subsequently, a sufficient clamping force is possibly not achieved. Where necessary, a new plastic nut has to be applied after the detaching step.

In particular when fastening objects at a vehicle, the provision of a sufficient clamping force is advantageous as vibrations can occur while driving the vehicle, which may promote a self-detaching of the plastic nut.

Loosening of the plastic nut can lead to an amplification of vibrations in body parts or trim parts of the vehicle. Body parts or trim parts of the vehicle may thus be worn faster. Further, body parts or trim parts of the vehicle may slap or grind against each other. Additionally, a trim part may become loose during driving the vehicle, which may form a significant origin of danger.

Further, objects fastened to a vehicle are exposed to strong environmental influences such as changes of temperature, impact of water and frost, which also alters the clamping force of a plastic nut, in particular a plastic nut that has been screwed on and off multiple times.

The assembly of body parts and/or trim parts is occasionally performed by hand. Thus, in particular when assembling several parts in a stacked manner, errors in the assembly can occur. For example, an object may be forgotten. Consequently, the plastic nut has to be screwed off so that the forgotten object can be arranged at the stud. When using the same plastic nut again for fastening, a critical loss of clamping force can occur so that a vehicle produced in this manner may not meet the quality standards. Thus, a plastic nut that has been screwed on and off multiple times should no longer be applied.

As the fastening and unfastening of the plastic nut is mainly performed with automatic nut drivers, the exchange of the plastic nut in the nut driver leads to a comparative long downtime.

BRIEF SUMMARY OF THE INVENTION

In the light of the above, it is an object of the present invention to provide an improved plastic nut, an improved fastening system and an improved method for fastening, wherein downtime is minimized and a fastening quality standard is met.

The above object is solved by a plastic nut comprising the features of claim 1, wherein starting from the plastic nut mentioned above, a clamping device is provided which is configured to provide a clamping force between the plastic nut and the stud.

The above object is furthermore achieved by a fastening system of the above described type, wherein the plastic nut is a plastic nut according to the invention.

Finally, the above object is achieved by a method for fastening an object, which has an opening, with respect to a stud which is joined onto a workpiece of a fastening system of the type according to the invention, with the steps: arranging the object on the workpiece in such a manner that the stud protrudes through the opening, placing the plastic nut onto the stud and screwing the plastic nut onto the stud until the support surface of the plastic nut touches an outer side of the object.

The inventive plastic nut can be applied like a plastic nut known from prior art. Thus, a modification of automatic nut drivers may be obsolete. The clamping device is formed such that even when fastening and unfastening the plastic nut several times, a minimum clamping force remains. Thus, no loss of quality occurs when the plastic nut is not exchanged.

The object is therefore completely achieved.

According to a preferred embodiment, the clamping device is arranged at an end of the base body, which end is arranged opposite to the support surface.

Therefore, a distance between the support surface and the clamping device is provided such that damage of the clamping device due to strong tightening can be prevented.

This contributes to a reduced wear of the clamping device, in particular when the plastic nut is screwed on and off multiple times.

Further, the provision of a clamping device at an end of a plastic nut can be realized in a simple technical manner.

According to a further preferred embodiment, the clamping device comprises at least one clamping nose, which extends radially elastically into a cross section matching the cross section of the cylindrical recess.

When screwing the plastic nut onto the stud, the clamping nose preferably yields in a radial direction and clamps against a thread of the stud.

The radial distance between the clamping nose and an axial symmetry axis is thus smaller than the radius of the cylindrical recess.

By providing a clamping nose, a clamping device can be realized with little expenditure of material.

According to a further preferred embodiment, the clamping device comprises a radially elastic hollow cylinder section, which is arranged concentric to the cylindrical recess.

The hollow cylinder section is not to be understood to comprise a strict cylindrical shape. For example, a conical or an elliptical shape is also possible. Generally, any shape is possible that allows an elastic retracting and subsequently clamping. In addition, the hollow cylinder section does not necessarily form a full circle in cross section. Instead, the hollow cylinder section may have a circumferential extension of less than 360°, for example 90° or even less. The hollow cylinder section may be formed of multiple such sections, being spaced apart from each other in the circumferential direction.

Further, the wall thickness of the hollow cylinder may vary with the circumference.

Thereby, the flexible and elastic hollow cylinder can be radially widened or radially deflect during screwing the plastic nut onto the stud, and thus provide a holding or clamping force in a radial direction.

According to a further preferred embodiment, the hollow cylinder section comprises a deformable area at an inner surface in which a thread can be formed, in particular by the stud. The deformable area is for example made in a plastic material allowing deformation and/or has a shape (for instance a thickness) which allows a deformation of this area prior the deformation of others area in the vicinity.

The thread can be cut in the deformable area. It is also possible that the thread is achieved without removal of material by stamping or embossing a thread in the deformable area.

Thereby, the clamping force of the clamping device can be further improved.

The hollow cylinder section may extend over a range of 80°, preferably over a range from 0° to 360°.

Further, several hollow cylinder sections may be provided, for example two, three or even more.

According to a particularly preferred embodiment, the plastic nut is designed as an integral injection-molded part.

In this preferred embodiment, the plastic nut can be manufactured in a comparative simple manner, preferably in a single injection-molding step. The material of the plastic nut and the clamping device may be identical, and is preferably a relatively hard plastic material such as, for example, PA, which may also be fiber-reinforced.

It is also possible to provide different materials for the plastic nut and the clamping device.

According to a preferred embodiment, a ratio of an average wall thickness of a stem portion of the plastic nut to an average wall thickness of the hollow cylinder section is smaller than 20 and larger than 1, preferably smaller than 10 and larger than 2 and in particular preferably smaller than 8 and larger than 2.5.

In this manner, a compact plastic nut with a clamping device can be realized.

According to a further preferred embodiment, a ratio of an axial length of a stem portion of the plastic nut to an axial length of the hollow cylinder section is smaller than 10 and larger than 1, preferably smaller than 8 and larger than 4, and in particular preferably smaller than 6 and larger than 4.5.

Thereby, the axial dimension of the plastic nut inclusive the clamping device is the same or negligibly larger as in plastic nuts known from prior art. Thus, standard automatic nut drivers can be used when working with the plastic nuts according to the invention.

Preferably, the length of the stud may be the same as for plastic nuts known from prior art. A modification of the manufacturing process or provision of other studs is thus not necessary.

The plastic nut can be implemented in an existing tool without or without complicated modification of the tool.

The plastic nut can be used for different types of stud and stud flange heights. The plastic nut is useable, for example, for steel studs and large-flange aluminum studs. The objects or components to be fastened can be thin-walled or thick-walled. The objects may be heat shields, wheel house claddings, under body panels, etc.

It goes without saying that the features mentioned above and those which have yet to be explained below can be used not only in the respectively stated combination but also in different combinations or in their own without departing from the scope of the present invention.

BRIEF DESCRIPTION OF THE SEVERAL VIEWS OF THE DRAWINGS

Exemplary embodiments of the invention are illustrated in the drawing and are explained in more detail in the description below. In the drawing.

DETAILED DESCRIPTION OF THE PREFERRED EMBODIMENTS

Figure 1:
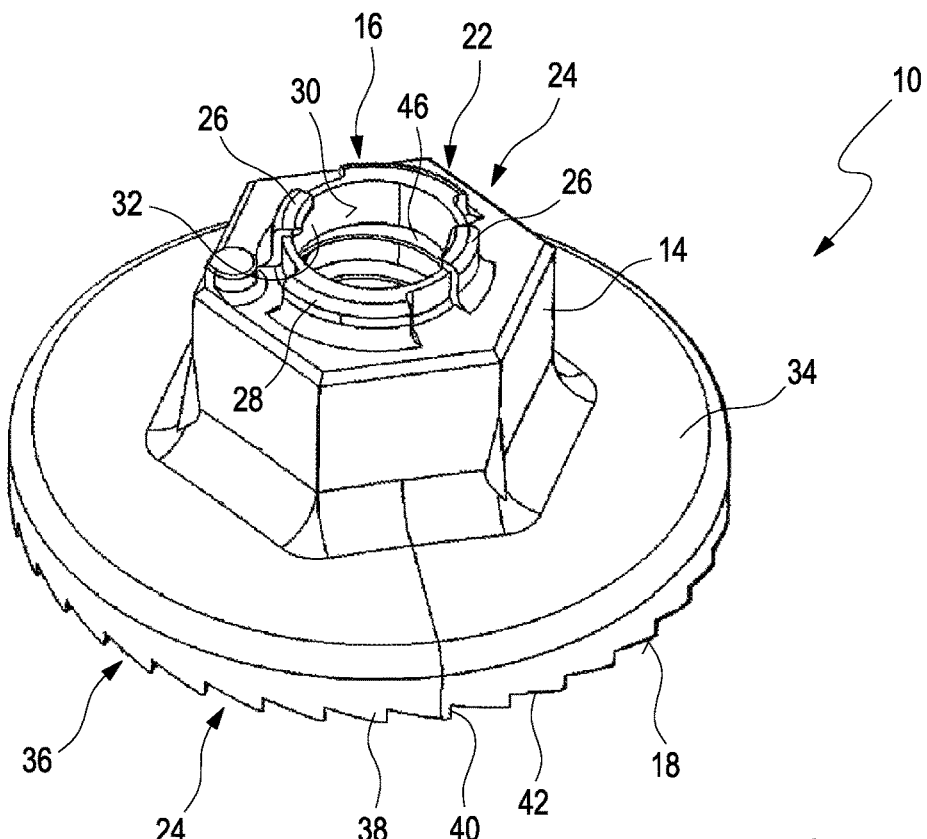
FIG. 1 shows a perspective illustration of a first embodiment of a plastic nut according to the invention.

FIG. 1 shows a first embodiment of an inventive plastic nut which is denoted in general by 10.

Figure 5:
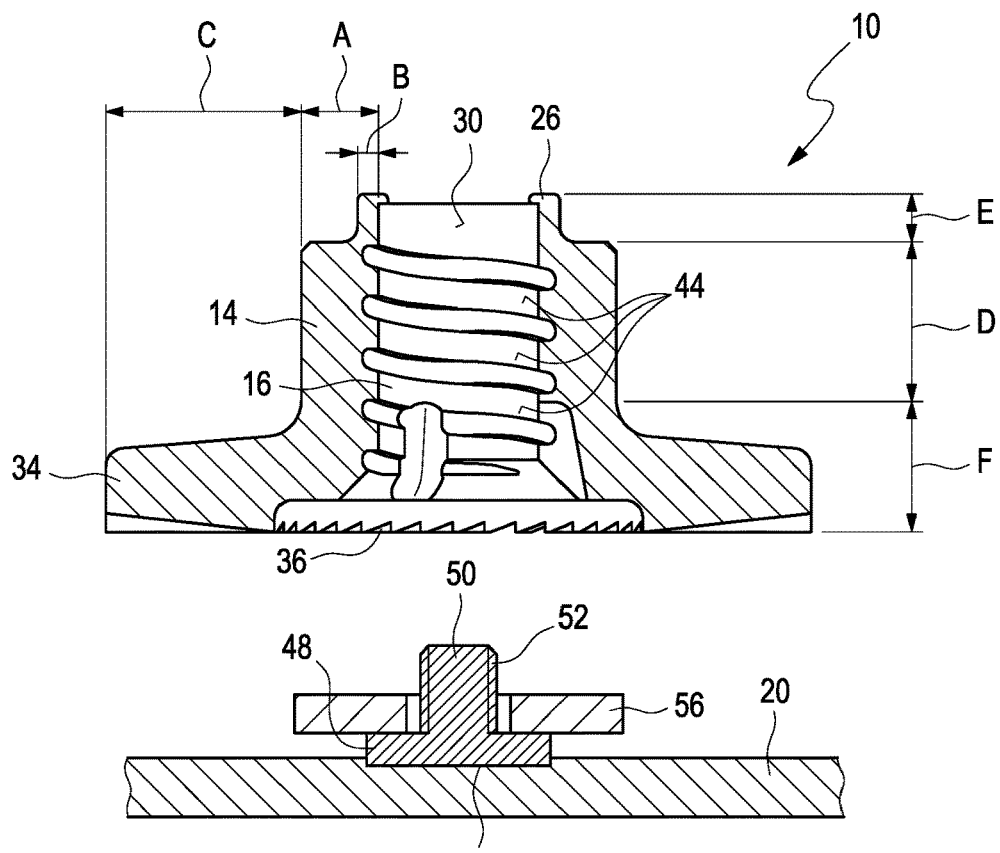
FIG. 5 shows a sectional view of a fastening system by means of which an object can be fastened to a workpiece, using a plastic nut of FIGS. 1 to 4, wherein the plastic nut is shown in a sectional view along the plane V-V of FIG. 3.

The plastic nut 10 is intended to be screwed onto a stud 12 and comprises a base body 14 having a cylindrical recess 16. At a bottom side of the plastic nut 10, a support surface 18 is provided. The bottom side is the side of the plastic nut 10 adapted to be arranged facing a workpiece 20 (FIG. 5).

A clamping device 22 is arranged at an axial end 24 of the base body 14 opposite to the support surface 18. The clamping device 22 comprises at least one clamping nose. For instance, the clamping device 22 comprises two clamping noses 26 and a hollow cylinder section 28, wherein at the inner surface 30 of the hollow cylinder section 28 a deformable area 32 is provided.

The support surface 18 is arranged at a flange 34, wherein a saw-tooth profile 36 is provided at the support surface 18.

The saw-tooth profile 36 comprises several raised portions 38, which comprise short or steep flanks 40 and long or flat flanks 42.

The raised portion 38 are evenly distributed on the support surface 18.

At an inner surface 44 of a base body stem portion, an inner thread 46 is formed.

The outer surface of a stem portion of the plastic nut 10 is a tool engagement portion and is for example formed as hexagon, wherein other embodiments like a butterfly nut etc. are also possible.

The inner thread 46 is provided along the whole axial length of the stem portion of the plastic nut 10, wherein the inner surface 30 of the hollow cylinder section 28 does not comprise a thread.

It goes without saying that embodiments are possible in which multiple of the hollow cylinder sections 28 are provided along the circumference of the cylindrical recess 16.

Figure 2:
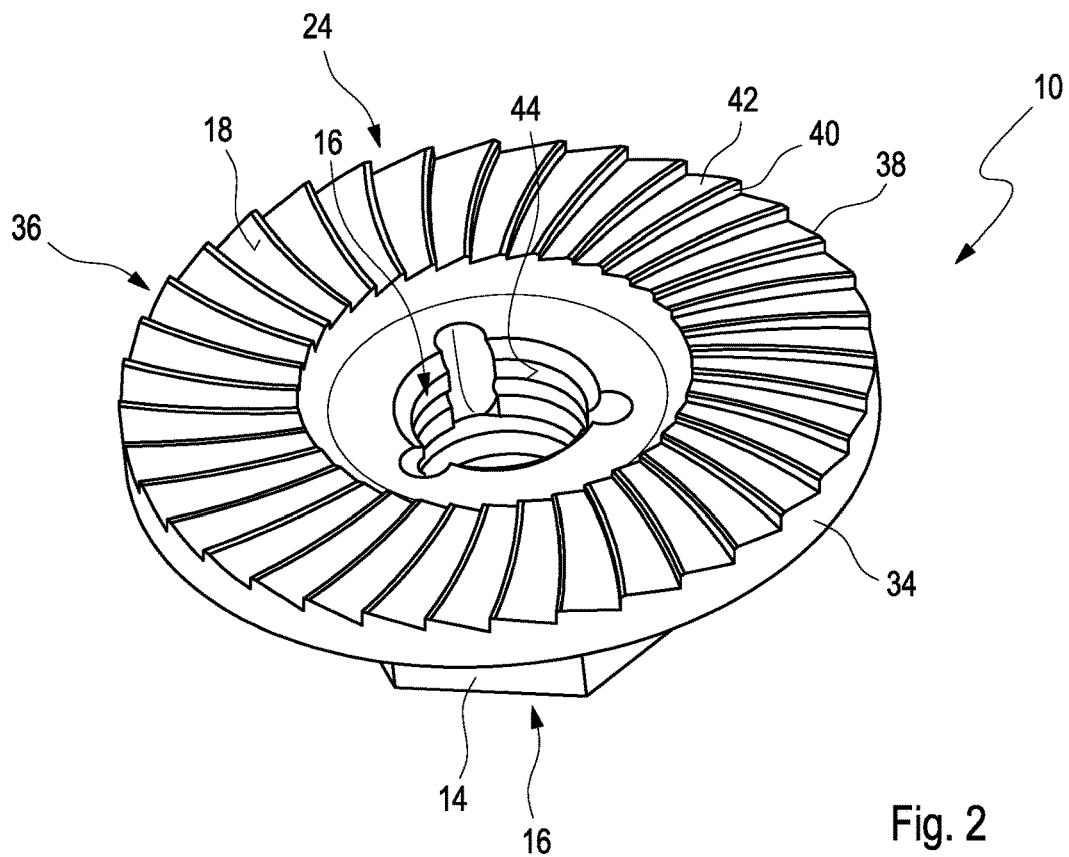
FIG. 2 shows a perspective bottom view of the plastic nut of FIG. 1.

FIG. 2 perspectively shows a bottom view of the plastic nut 10 according to FIG. 1.

At the support surface 18, the saw-tooth profile 36 is provided, wherein edges formed by the flanks 40, 42 of the raised portion 38 comprise a curvature in radial direction.

It goes without saying that other types of profiles can be provided, like for example corrugations, fish skins or single raised dots.

Figure 3:
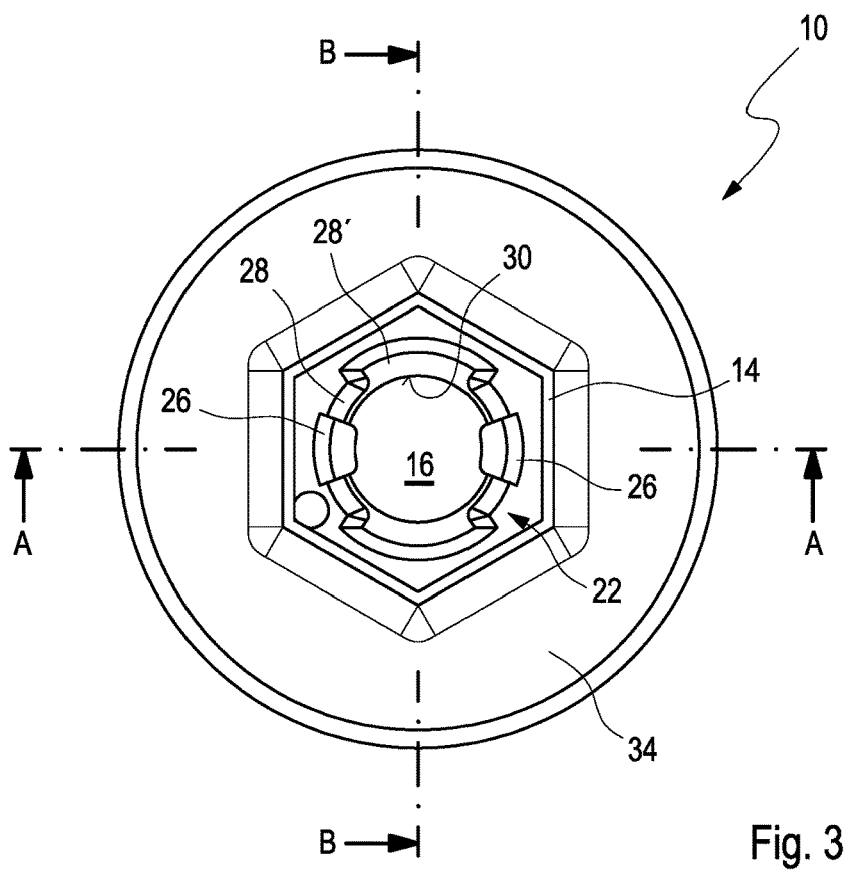
FIG. 3 shows a plan view of the plastic nut of FIGS. 1 and 2.

FIG. 3 shows a plan top view of the plastic nut 10.

The radial elastic clamping noses 26 radially extend into the cross-section of the cylindrical recess 16, and are arranged opposed to each other.

The radial elastic hollow cylinder section 28 comprises at its circumference two enhancements 28', so that at least partially a larger wall thickness can be provided.

Figure 4:
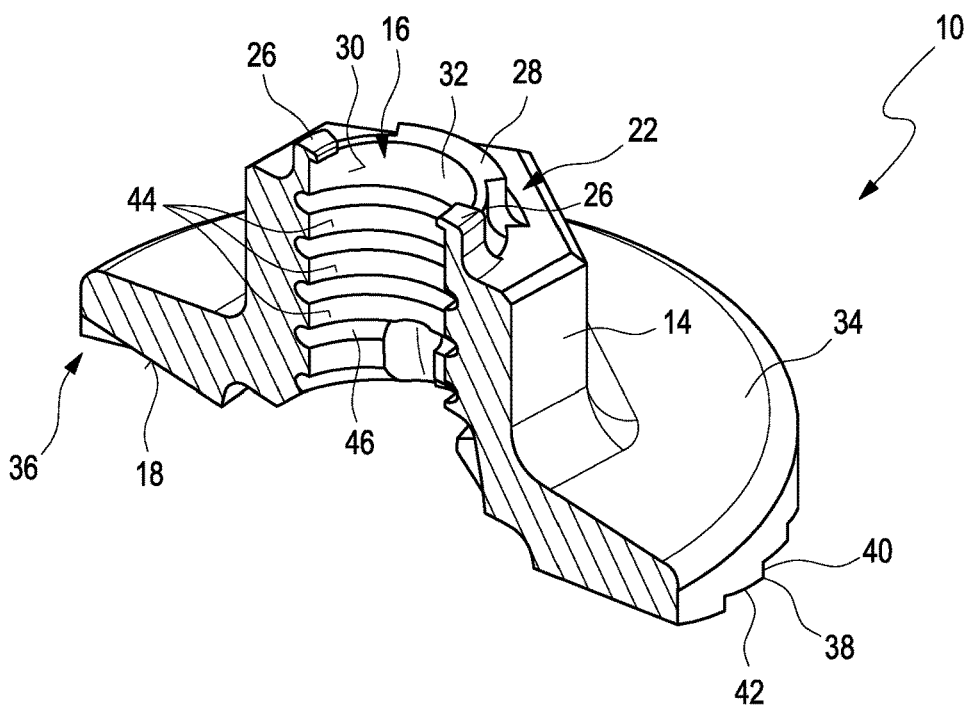
FIG. 4 shows a perspective sectional view through the plastic nut of FIGS. 1, 2 and 3.

FIG. 4 perspectively shows a sectional view of the plastic nut 10 through the two clamping noses 26. At the inner surface 44 of the base body stem portion, the inner thread 46 is formed.

FIG. 5 shows a sectional view of a fastening system with a plastic nut 10, which is shown in a sectional view along a plane V-V of FIG. 3, and a stud 12. The stud 12 comprises a flange portion 48 and a stem portion 50, wherein at the stem portion 50 an outer thread 52 is formed. At a joining side 54, the stud 12 is joined onto a workpiece 20. An object 56 is arranged at the stud 12 such that the stem portion 50 of the stud 12 protrudes through an opening 58 of the object 56.

Figure 6:
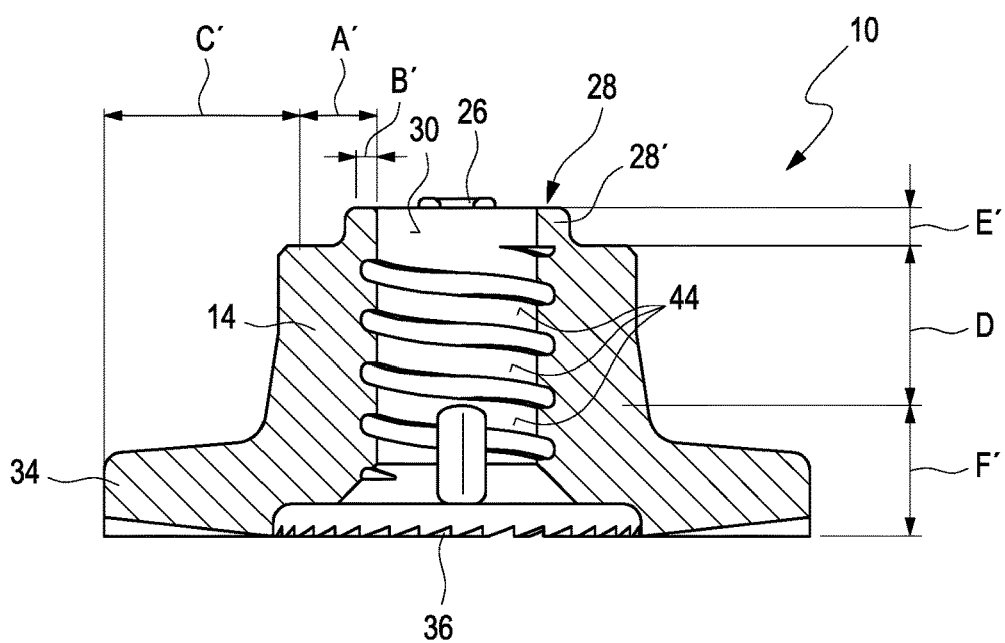
FIG. 6 shows a sectional view of the plastic nut of FIGS. 1, 2, 3 and 4 along the plane VI-VI of FIG. 3.

FIG. 6 shows a sectional view of the plastic nut 10 along a plane VI-VI of FIG. 3, extending through the hollow cylinder section 28, particularly through the two enhancements 28' thereof.

In FIGS. 5 and 6, several dimensions of the plastic nut 10 are provided. At A, A', a radial thickness of a stem portion of the plastic nut 10 is shown, wherein A is smaller than A' due to the hexagonal shape of the stem portion. The average wall thickness is defined by an average of the wall thicknesses A, A'.

At B, there is shown a wall thickness of the clamping noses 26, without the nose portion that extends into the cross-section of the circular recess 16. At B', there is shown the radial thickness of the extension 28' of the hollow cylinder section 28, wherein B' is larger than B.

At C, C', an average radial extension of the flange 34 of the plastic nut is shown, wherein C is the radial extension at a thinner portion of the wall thickness of the stem portion, and C' is the radial extension at a thicker portion of the stem portion. The average radial extension C, C' is formed by an average of those dimensions.

At D, an axial length of the stem section of the plastic nut is shown. At E, an axial length of the clamping noses is shown. At E', an axial length of the hollow cylinder section 28, 28' is shown.

A ratio of an average wall thickness A, A' of the stem portion of the plastic nut 10 to an average wall thickness B, B' of the hollow cylinder section 28 is smaller than 20 and larger than 1, preferably smaller than 10 and larger than 2, preferably smaller than 5 and larger than 2, or particularly smaller than 8 and larger than 2.5.

The average wall thickness B, B' of the hollow cylinder section 28 is formed by an average of the wall thickness B' of the extension 28' of the hollow cylinder section, and the hollow cylinder section wall thickness B in the area between the extensions 28', i.e. preferably at the area of the clamping noses 26.

A ratio of an axial length D of the stem portion of the plastic nut 10 to an axial length E' of the hollow cylinder section 28 is smaller than 10 and larger than 1, preferably smaller than 8 and larger than 4 and particularly preferable smaller than 6 and larger than 4.5.

A ratio of the average wall thickness A, A' of the stem portion of the plastic nut 10 to an average radial extension C, C' of the nut flange 34 lies in the range from about 2 to 5.

A ratio of an axial length D of the stem portion of the plastic nut 10 to an axial length E of the hollow cylinder section 28 lies in the range from about 4.5 to about 6.

A ratio of the axial length D of the stem portion of the plastic nut 10 to an axial length F of the flange 34 lies in the range from about 1 to about 3.

For fastening the plastic nut 10, the plastic nut 10 is arranged at the stud 12 and screwed in a first rotational direction onto the stud 12 so that the outer thread 52 of the stud 12 engages with the inner thread 46 of the base body 14 of the plastic nut 10.

Thereby, the plastic nut 10 is screwed onto the stud 12 until the support surface 18, which is arranged at the flange 34, comes into contact with a surface of the object 56, which is opposite to the workpiece 20. Preferably, the saw-tooth profile 36 of the plastic nut 10 enters at least partly into the surface of the object 56.

The clamping noses 26 retract elastically in radial direction due to interaction with the stud 12 and clamp the plastic nut 10 onto the stud 12. Further, the flexible hollow cylinder section 28 retracts elastically in radial direction, wherein the thread 52 of the stud 12 preferably cuts a thread into the deformable section 32 of the hollow cylinder section 28.

The steep flanks 40 of the saw-tooth profile 36 prevent a loosening of the plastic nut 10, wherein the flat flanks 42 ease a fastening of the plastic nut 10.

The plastic nut 10 is clamped by the radially elastic clamping noses 26 and by the hollow cylinder section 28 onto the stud 12.

When unscrewing the plastic nut 10, the elastic clamping noses 26 and the elastic hollow cylinder section 28 may move back into their original position.

When screwing the plastic nut 10 again onto the stud 12, the thread formed in the deformable area 32 is not worn out, since the hollow cylinder section 28 can deflect elastically in the radial direction.

Thereby, a remaining clamping force is maintained even when the plastic nut 10 is screwed on and off multiple times.

This is achieved particularly by the hollow cylinder section 28, the clamping noses 26 and optionally by the saw-tooth profile 36.

When cutting a thread in the hollow cylinder section 28 at the "head" of the plastic nut 10 by screwing the plastic nut 10 onto the stud 12, the clamping device 22 may slightly bend in a radial direction and, thus, permanently maintain a minimal clamping force onto the stud 12. As a result, a reduction of the clamping force due to a wearing effect of the thread 46 in the base body 14 after every screwing can be prevented.

The anti-release security thus provided by the clamping noses 26 or the hollow cylinder section 28 can also prevent a loss of the clamping force due to temperature and humidity changes in the screwed connection.

Due to entering of the saw-tooth profile 36 into smoother interlayers of the object 56, a tightening in fastening rotation direction can be eased by means of the flat flanks 42, wherein an unfastening of the plastic nut 10 is prevented by the steep flanks 40, which have preferably entered the surface of an object 56.

The short, steep flanks 40 preferably comprises a slope angle of more than 70°, preferably at least 80° and particular preferably about 90°, against a radial plane.

The long, flat flanks 42 comprises a slope of more than 0° and at least 40°, preferably at least 30° and particular preferably less than 15°, against a radial plane.

For fastening an object 56 by means of the fastening system, the object 56 is arranged at the workpiece 20 such that the stud 12 protrudes through an opening 58 of the object 56. Then, the plastic nut 10 is arranged at the stud 12 and rotated in a first rotational direction to be screwed onto the stud 12 until the support surface 18 of the plastic nut 10 enters into contact with an upper surface of the object 56.

If a second object should be fastened by means of the fastening system, the plastic nut 10 is rotated in a second rotational direction, which is opposite to the first rotational direction, until the plastic nut 10 disengages with the thread 52 of the stud 12. A large force may be needed due to the saw-tooth profile 36. The disengaging force is preferably larger than the force applied for fastening the plastic nut 10.

The plastic nut 10 is then removed from the stud 12. The second object is arranged at the workpiece 20 such that the stud 12 protrudes through an opening of the second object; if necessary, the first object 56 can be removed in advance.

Finally, the plastic nut 10 is again arranged at the stud 12 and screwed in the first rotational direction onto the stud 12 until the support surface 18 of the plastic nut 10 enters into contact with an outer surface of the second object. Preferably, the saw-tooth profile 36 enters at least partly the surface of the second object.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A plastic nut (10) for multiple detachable fastening onto a stud (12) with a thread protruding from a workpiece (20), the plastic nut comprising:
    a base body (14) including an inner surface partially defining a cylindrical recess (16) penetrating the base body (14);
    a support surface (18) attached to the base body at a first axial end, the support surface including a repeating saw tooth (36) profile; and
    a clamping device (22), which is configured to provide a clamping force between the plastic nut (10) and the stud (12) when the stud is installed in the cylindrical recess, is attached to the base body at second axial end opposite to the first axial end and the clamping device (22) includes a radially elastic hollow cylinder section (28), which is arranged concentrically to the cylindrical recess (16), and further includes an elastic clamping nose (26), which extends radial into a cross section matching the cross section of the cylindrical recess (16).

2. The plastic nut (10) according to claim 1, wherein the clamping device (22) is located at a second end (24) of the base body (14), and the second end (24) is opposite to the support surface (18).

3. The plastic nut (10) according to claim 1, wherein the hollow cylinder section (28) comprises a deformable area (32) at an inner surface (30) in which a thread can be formed by the stud (12).

4. The plastic nut (10) according to claim 1, wherein the plastic nut (10) is an integral injection-molded part.

5. The plastic nut (10) according to claim 1, wherein a ratio of an average wall thickness (A, A') of a stem portion of the plastic nut (10) to an average wall thickness (B, B') of the hollow cylinder section (28) is smaller than 20 and larger than 1.

6. The plastic nut (10) according to claim 1, wherein a ratio of an axial length (D) of a stem portion of the plastic nut (10) to an axial length (E') of the hollow cylinder section (28) is smaller than 10 and larger than 1.

7. A fastening system for connecting to a workpiece, the fastening system comprising:
    a stud (12), including a flange section (48) and a stem section (50), the stem section (50) extending axially from a first side of the flange section (48) and includes a stud thread (52), and a second side of the flange section (48) that faces away from the stem section (50) is a joining side (54) for joining the stud (12) onto the workpiece (20), and
    a plastic nut (10) including:
        a base body (14) including an inner surface partially defining a cylindrical recess (16) penetrating the base body (14);
        a support surface (18) attached to the base body at a first axial end, the support surface including a repeating saw tooth (36) profile; and
        a clamping device (22), which is configured to provide a clamping force between the plastic nut (10) and the stud (12) when the stud is installed in the cylindrical recess, is attached to the base body at second axial end opposite to the first axial end and the clamping device (22) includes a radially elastic hollow cylinder section (28), which is arranged concentrically to the cylindrical recess (16), and further includes an elastic clamping nose (26), which extends radial into a cross section matching the cross section of the cylindrical recess (16).

8. A method for fastening an object (56) partially defining a through opening (58), with respect to a stud (12) which is joined to a workpiece (20), with a fastening system, the method comprising the following steps:
    providing a fastening system for connecting to a workpiece, the fastening system comprising:
        a stud (12), including a flange section (48) and a stem section (50), the stem section (50) extending axially from a first side of the flange section (48) and including a stud thread (52), and a second side of the flange section (48) that faces away from the stem section (50) is a joining side (54) for joining the stud (12) onto the workpiece (20);

a plastic nut (10) including: a base body (14) including an inner surface partially defining a cylindrical recess (16) penetrating the base body (14); a support surface (18) attached to the base body at a first axial end, the support surface including a repeating saw tooth (36) profile; and a clamping device (22), which is configured to provide a clamping force between the plastic nut (10) and the stud (12) when the stud is installed in the cylindrical recess, is attached to the base body at second axial end opposite to the first axial end and the clamping device (22) includes a radially elastic hollow cylinder section (28), which is arranged concentrically to the cylindrical recess (16), and further includes an elastic clamping nose (26), which extends radial into a cross section matching the cross section of the cylindrical recess (16);

arranging the object (56) on the workpiece (20) with the stud (12) protruding through the opening (58); and placing the plastic nut (10) onto the stud (12) and screwing the plastic nut (10) down onto the stud until the support surface (18) of the plastic nut (10) touches an upper surface of the object (56).

9. A plastic nut according to claim 1, wherein the sawtooth profile (36) comprises a repeating pattern of a raised portion (38), and the raised portion 38 includes a short steep flank (40) and a long flatter flank (42).

10. A plastic nut according to claim 9, wherein the raised portions (38) curve in a clockwise direction as they extend radially outward over the support surface (18).

11. A plastic nut according to claim 9, wherein the short steep flank (40) defines a steep slope angle of more than 70° relative to a plane of the support surface, and the long flatter flank (42) defines a shallow slope angle of no more than 40° relative to the plane.

12. A plastic nut according to claim 1, wherein the clamping nose (26) is a first clamping nose, and clamping device further includes a second camping nose.

* * * * *